United States Patent [19]

Dola et al.

[11] Patent Number: 4,874,322
[45] Date of Patent: Oct. 17, 1989

[54] SURFACE APPLIED WIRING APPARATUS

[75] Inventors: Frank P. Dola, Hudson; Steven Feldman; John K. Erwin, both of Seminole, all of Fla.

[73] Assignee: AMP Incorporated, Harrisburg, Pa.

[21] Appl. No.: 101,713

[22] Filed: Sep. 28, 1987

[51] Int. Cl.⁴ .............................................. H02G 3/04
[52] U.S. Cl. ..................................... 439/210; 439/215; 174/49; 52/239; 248/223.4
[58] Field of Search ................ 174/48, 49, 70 C, 72 C, 174/97, 101; 52/36, 239; 439/110–122, 207–216; 248/222.1, 223.4, 224.1, 224.2, 243

[56] References Cited

U.S. PATENT DOCUMENTS

| | | | |
|---|---|---|---|
| 2,156,633 | 5/1939 | LaDucer | 174/48 |
| 3,012,217 | 12/1961 | Pantin . | |
| 3,061,810 | 10/1962 | Boyd . | |
| 3,195,698 | 7/1965 | Codrea | 189/34 |
| 3,329,763 | 7/1967 | D'Esopo | 174/70 |
| 3,347,275 | 10/1967 | Murphy | 138/116 |
| 3,377,756 | 4/1968 | Polhamus | 52/220 |
| 3,404,706 | 10/1968 | D'Esopo | 138/163 |
| 3,461,220 | 8/1969 | Hukin . | |
| 3,464,052 | 8/1969 | Hukin . | |
| 3,471,629 | 10/1969 | O'Leary | 174/49 |
| 3,589,083 | 6/1971 | Sclafani | 52/27 |
| 3,708,607 | 1/1973 | Brode et al. | 174/48 |
| 3,721,762 | 3/1973 | Gooding | 174/48 |
| 3,759,297 | 9/1873 | Anderson et al. | 174/48 |
| 3,761,603 | 9/1973 | Hays et al. | 174/101 |
| 3,814,833 | 6/1974 | Yamada et al. | 174/48 |
| 3,881,520 | 5/1975 | Murphy | 138/109 |
| 4,017,137 | 4/1977 | Parks | 174/48 |
| 4,037,900 | 7/1977 | Schmidger | 439/216 |
| 4,255,610 | 3/1981 | Textoris | 174/48 |
| 4,308,418 | 12/1981 | VanKuik et al. | 174/48 |
| 4,313,646 | 2/1982 | Millhomes et al. . | |
| 4,360,705 | 11/1982 | Rogers | 174/48 |
| 4,479,687 | 10/1984 | Humphreys et al. . | |
| 4,558,546 | 12/1985 | Nusbaum | 174/49 |
| 4,606,595 | 8/1986 | Dola . | |
| 4,618,064 | 10/1986 | Viklund | 248/222.1 |
| 4,688,869 | 8/1987 | Kelly | 439/209 |

FOREIGN PATENT DOCUMENTS

| | | | |
|---|---|---|---|
| 3114225 | 11/1982 | Fed. Rep. of Germany | 174/48 |
| 1009092 | of 0000 | United Kingdom . | |
| 1039015 | of 0000 | United Kingdom . | |
| 2147152 | 5/1985 | United Kingdom | 174/48 |

OTHER PUBLICATIONS

"Architectural Aluminum", The Wiremold Company, Copyright 1987.
"Series 9000 Systems Furniture Wiring and Cabling Guide" from Steelcase, pp. 21–25.
"Series 9000 Systems Furniture Continually Evolving Solutions for Information Age Offices" from Steelcase, p. 17.
"Total Surface Wiring System . . . Power, Data and/or Communications" from Airey-Thompson Co., Copyright 1986.

*Primary Examiner*—Gary F. Paumen
*Attorney, Agent, or Firm*—Robert W. Pitts

[57] ABSTRACT

A surface applied electrical raceway assembly comprising an extruded rear panel and an extruded cover which form a plurality of elongate compartments for deploying wires or other electrical conductors is disclosed. At any position along its length, the raceway can be attached to hanger brackets mounted on a wall. Continuous recesses including a tongue and groove configuration on the exterior of the rear panel and channels in at least one compartment permit attachment of the raceway to the hangers at any position and the installation of interfaces, such as standard duplex outlets, at any position along the raceway length. A storage compartment for receiving excess plug cables is also disclosed. The rear panel and the covers can be cut to length and together with accessory fittings can be used to form customized raceways with outlets at any desired location.

23 Claims, 13 Drawing Sheets

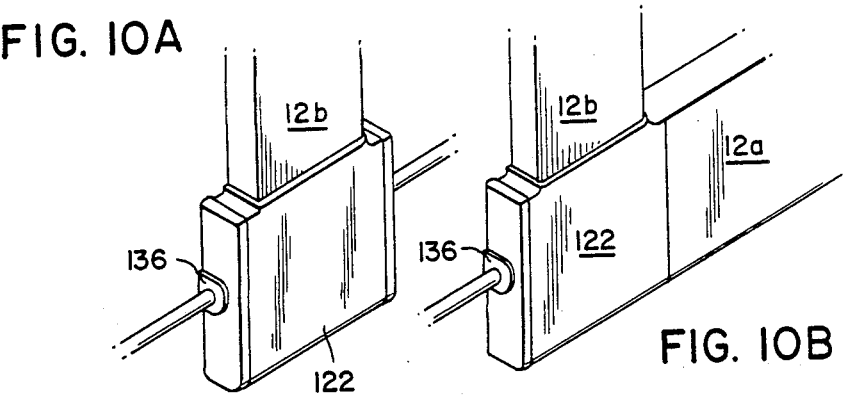
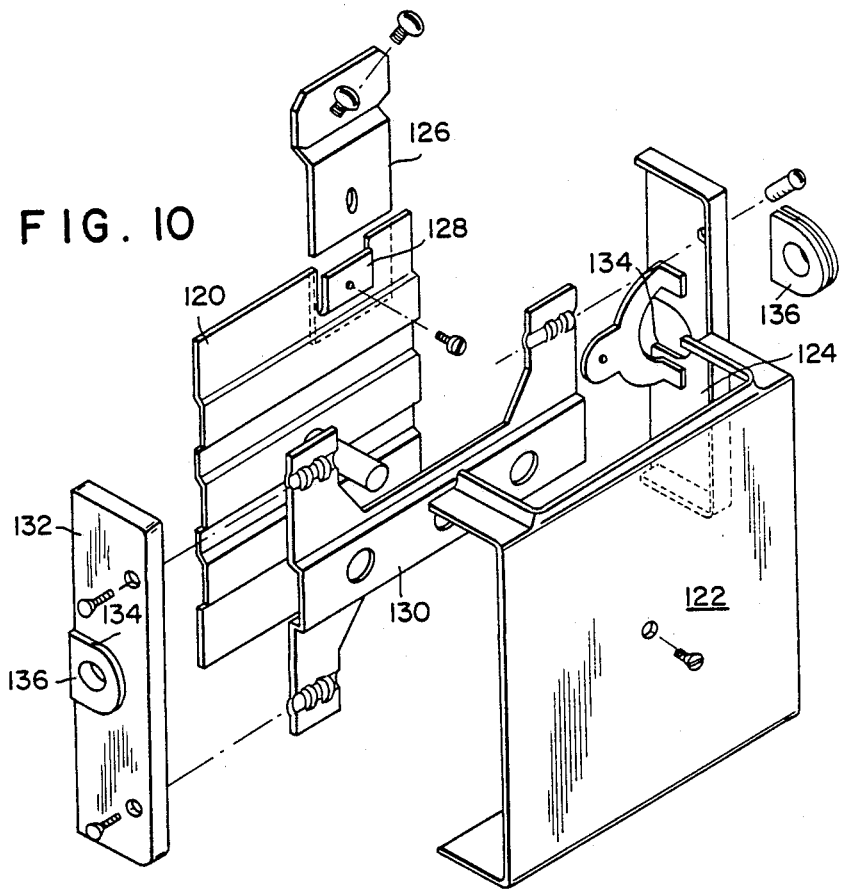

SURFACE APPLIED WIRING APPARATUS

BACKGROUND OF THE INVENTION

1. Field of the Invention

This invention relates to a raceway assembly which can be employed to mount a plurality of electrical wires, including power conductors and telephone or data conductors on the surface of a wall or partition.

2. Description of the Prior Art

Buildings having conventional wiring systems with conduits containing power cables and with telephone wires embedded within the permanent walls of the structure lack the flexibility needed for present office environments where changes in office layout are constantly being made. Typically, modular wall panels are used to form interior partitions which are never intended to be permanent. However, the presence of permanently mounted electrical conduits and fixtures limit the flexibility of modular office systems. Among the systems which have been used to permit relatively quick changeover of electrical wiring are undercarpet wiring and panel mounted wiring in which wiring and electrical outlets are mounted directly in modular panels. Surface mounted raceway systems have also been employed. These surface mounted raceway systems are generally constructed of a conductive metal such as aluminum and are divided into a plurality of separate compartments. A typical raceway will contain one elongate compartment for high voltage power cables and a separate compartment for low voltage telephone wires.

Each surface raceway system is generally unique and includes a plurality of subsidiary separate components which must be assembled to form a completed assembly. Surface applied or mounted raceways are described in a number of issued patents including the following.

U.S. Pat. No. 3,404,706 discloses raceways having a rectangular shaped channel formed base having sidewalls which are reversely bent in-turned ends to engage a cover. Corner or end fittings are secured to the raceways by separate couplings which are screwed both to the raceways and the fittings. Mounting plates for receptacles, switches and other wiring devices are clamped to the base between covers to prevent removal by an outward force. A cover section joint-shielding member for providing complete shielding against outside interference has a shield plate having a greater width than the supporting strap to which it is attached to provide complete shielding when the shield plate is snapped in place to a raceway base between adjacent cover sections.

U.S. Pat. No. 4,360,705 discloses a corner fitting for an aluminum raceway system having two isolated wiring compartments in which telephone wiring and electrical power can be channeled to office work stations. A continuity coupling is secured by screw fasteners between the corner fitting and upstream and downstream raceways.

U.S. Pat. No. 3,881,520 discloses a one-piece metal raceway having an integral coupling portion extending longitudinally from one end of the raceway base. The coupling portion includes a slot to impart resiliency upon engagement of the coupling portion with another interfitting raceway.

U.S. Pat. No. 4,017,137 discloses an electrical raceway having a channel-shaped cover having parallel sidewalls extending for cooperating interlocking engagement with the raceway base and plurality of receptacles mounted in the cover. Ribs on opposite sides of the receptacle engage arcuate projections on the cover sidewalls to retain the receptacles in assembly with the cover.

Available surface mounted or applied raceway systems are, however, incapable of handling the increasing number of cables and conductors which are present within an office or similar environment. The increasing use of distributed computing systems, data processing equipment, word processors and other equipment brings with it an ever increasing amount of cables and wires, resulting in a proverbial rats nest on every desk. A cable distribution system which provides a systematic and flexible method of deploying the various types of cables is therefore needed. This invention provides such a system in the form of a new surface applied raceway system.

SUMMARY OF THE INVENTION

A raceway assembly for use in deploying wires along the surface of a wall includes a rear panel and a cover which define a plurality of elongate compartments in which separate cables can be positioned. The rear panel can be attached to the surface of a wall and electrical outlets can be positioned within the compartments at any location along the wall. The rear panel and the cover have a constant cross section throughout their length and can be fabricated from an extruded or formed conductive material so that the separate cables, or other electrical systems which must be isolated from each other, are separated along their length eliminating the need for an external conduit. A tongue and groove configuration defined on the exterior of the rear panel permits attachment of the raceway to an external hanger at any position along its length. The hangers have at least one protruding lip dimensioned to engage the tongue and groove on the rear panel. Continuous channels formed on the interior of the rear panel within at least one compartment allow attachment of standard electrical interface outlets, such as duplex receptacles, at any position along the length of the raceway. Separate receptacle brackets which can be mounted in the channels are employed. Abutting sections of the raceway can be electrically grounded by splice wedges inserted into aligned channels. The rear panels and the covers, which form the principal components of the raceway can be cut to length. Corner fittings, outlet covers and related accessory items can be used with the rear panels and covers to form the completed raceway assembly.

BRIEF DESCRIPTION OF THE DRAWINGS

FIG. 10 is an exploded perspective view of a permanent interconnection to free standing round cables.

FIG. 10A is a fragmentary perspective view depicting the assembled configuration shown in FIG. 10.

FIG. 10B is a view similar to FIG. 10A showing a free cable attached at the intersection of a horizontal raceway and a vertical raceway.

DETAILED DESCRIPTION OF THE PREFERRED EMBODIMENT

Figure 1:
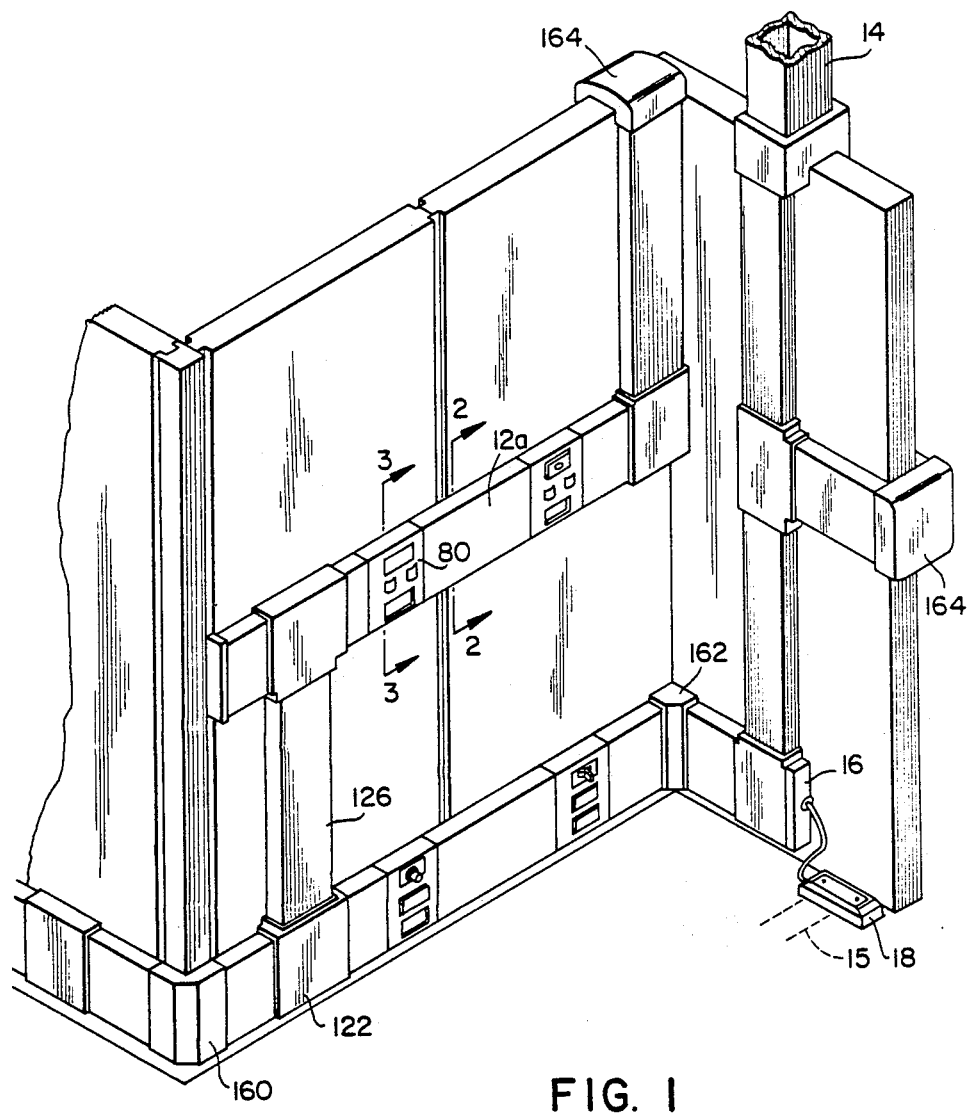
FIG. 1 is a perspective view showing the manner in which a surface applied raceway assembly could be mounted on a wall fabricated by using a plurality of wall panels.

FIG. 1 shows an illustration of a raceway assembly which can be mounted on the surface of a wall in an office or other building. This raceway assembly is especially useful in an environment in which wiring changes must be periodically made. The illustrative example shown in FIG. 1 is not intended to depict an actual installation, but is intended to show the various elements of the surface applied or surface mounted raceway assembly. Horizontal or vertical raceway sections 12a and 12b, respectively, can be mounted on wall 6 and outlets for power cables 2, telephone and data cables 4, or other wires can be located at any desired position. The principal components of the raceway assembly 10 will comprise raceway sections 12a and 12b each consisting of a rear panel 20 and a cover 40. Both the rear panel 20 and the covers 40 comprise elongate members having a constant cross section. The rear panel 20 and the covers 40 can be supplied in standard lengths, which can be cut to length for specific installations. Both horizontal raceway sections 12a and vertical raceway sections 12b can be fabricated using identical rear panels 20 and covers 40. In the preferred embodiment of this invention, the rear panels 20 and the covers 40 are fabricated from a conductive material such as aluminum. Since both the rear panels 20 and the covers 40 can be fabricated from aluminum and each has a constant cross section, both of these principal components of the raceway assembly 10 can be extruded.

The surface applied or surface mounted raceway assembly depicted herein is suitable for use with other wiring systems. FIG. 1 depicts two alternate methods in which power, data, telephone, or other electrical currents and signals can be fed into the surface applied raceway assembly 10 or in which electricity can be transmitted to other compatible wiring systems. For example, FIG. 1 shows a conventional power pole through which power or telephone conductors can be deployed into a vertical section 12b of the raceway assembly. FIG. 1 also shows the use of a cable interface end bracket 16 and an undercarpet floor receptacle 18 to interconnect cables in the surface applied raceway assembly 10 to undercarpet cable 15.

Other standard components which can be employed as desired in a surface applied raceway assembly 10 are also shown in FIG. 1. Outside corner fittings 160 and inside corner fittings 162 provide for transition between orthogonal walls. Wrap around fittings 164 can be used for the transition between portions of the raceway assembly 10 located on opposite sides of a wall or other partition. Tee transition covers, such as a Tee up transition block cover 122, can also be deployed at the intersection between horizontal raceway sections 12a and vertical raceway sections 12b. Outlet covers 80 can be arbitrarily located in the raceway assembly 10 at any desired location.

Figure 2:
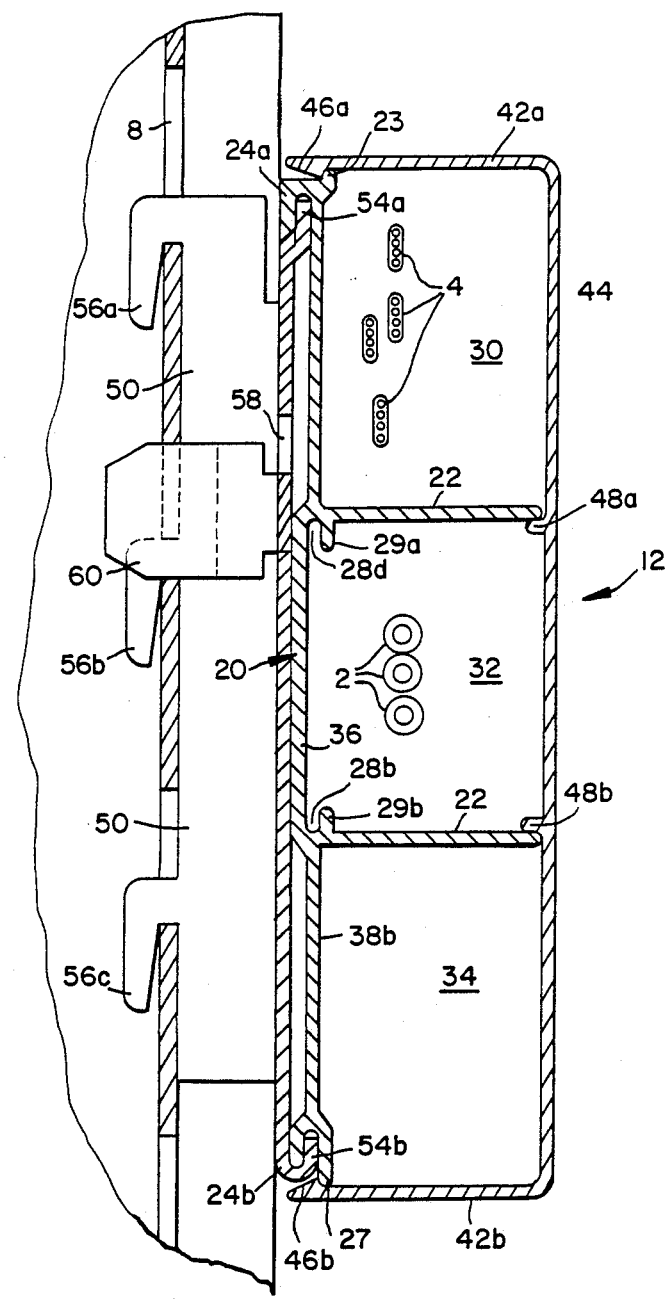
FIG. 2 is a sectional view showing the manner in which the raceway assembly can be secured to a conventional modular wall panel.
Figure 3:
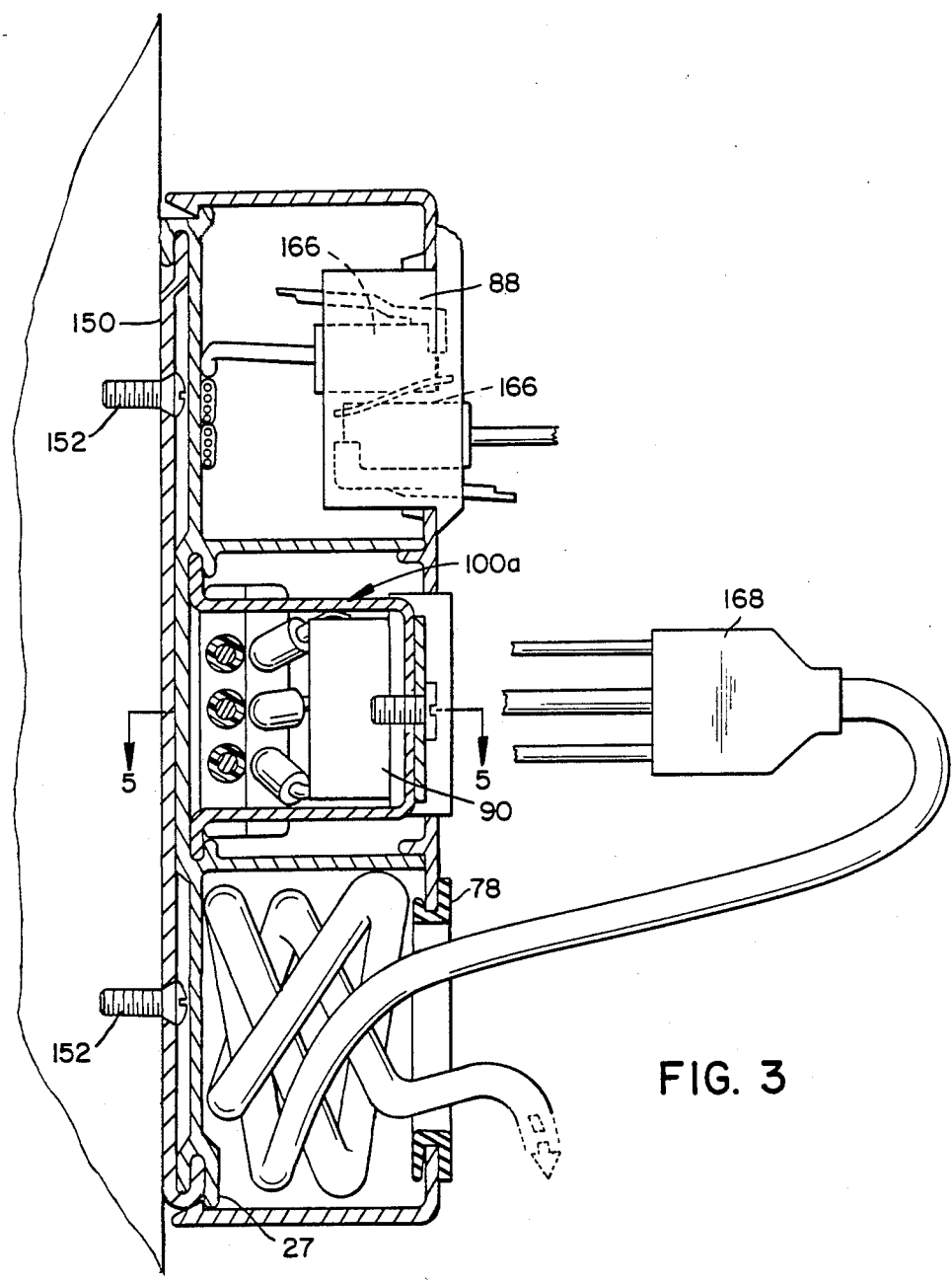
FIG. 3 is a view showing the manner in which the raceway can be secured to a permanent wall and showing the manner in which power and data or telephone receptacles can be mounted in the raceway assembly.

FIGS. 2 and 3 are sectional views of two representative positions within a raceway assembly 10 such as that shown in FIG. 1. FIG. 2 shows a raceway section 12 mounted on a standard modular wall panel such as that shown in FIG. 1. A modular panel hanger bracket 50 can be secured within apertures 8 located in a vertical row at the intersection between standard modular wall panel partitions. FIG. 2 shows a section of the raceway through which power cables 2 and telephone cables 4 extend without exterior interconnection. FIG. 3, which is taken at section lines 3—3 in FIG. 1, depicts a standard outlet in which provision is made for interconnecting conventional duplex receptacles and for the interconnection of data cables, in this case telephone cables, through a standard coupler 88 which can be used with modular telephone jacks 166. It should be noted that FIG. 3 also shows a hanger bracket 150 of the type which can be secured by the use of pan head screws 152, either at locations between modular wall panel joints or to a permanent wall. It should be understood that it would not generally be necessary to include hanger brackets 150 in a permanent wall panel installation since the modular panel brackets 50 would be sufficient to secure the raceway assembly 10 on the surface of the modular wall panels. Hanger bracket 150 shown in FIG. 3 demonstrate the versatility of this raceway assembly.

The raceway assembly depicted in FIGS. 2 and 3 shows a three compartment raceway configuration in which separate and isolated elongate compartments are formed. The raceway compartments are open on the front to be accessible to permit wiring to be laid into the compartments without pulling the wiring through sections. The raceway compartments shown in FIG. 2 include a telephone, signal or data cable compartment 30, a power cable compartment 32 and a cord cable storage tray or compartment 34. It should be understood, however, that additional compartments could be employed, or the three compartments shown in FIGS. 2 and 3 could be used for other purposes. It is important to note that compartments 30, 32 and 34 are isolated and shielded, one from the other, to permit cables at high and low potentials to be deployed in the same raceways, while minimizing the effects of cross-talk. For example, the power cable 2 depicted herein would be at a much higher potential than the telephone conductors 4 shown herein. Since the rear panels 20 and the covers 40 are each formed of an electrically conductive material, these separate compartments 30 and 32 will each be completely surrounded by a grounded metal shell, so that each compartment can in effect comprise a separate conduit.

The rear panels 20, which have a constant cross section throughout their length, could normally be supplied in standard extruded lengths. The rear panels 20 depicted in FIGS. 1-4 are for use in three compartment raceway assemblies 10. Divider walls 22, integral with the back wall of the rear panels 20, extend orthogonally relative to the back walls to separate the three compartments 32, 34 and 36. The back wall of rear panel 20 is divided into three sections including a back wall center section 36 and exterior back wall sections 38a and 38b located on opposite sides of center section 36. The center back wall section 36 is stepped relative to the outer back wall sections 38a and 38b, as shown in FIG. 2 and FIG. 3. The center back wall section 36 is intended to be flush with a hanger bracket, such as modular panel hanger bracket 50 or screw down hanger bracket 150. The exterior back wall sections 38a and 38b are spaced from the hanger brackets. One result of the spaced relationship of the exterior back wall sections 38a and 38b relative to the hanger brackets is that clearance is provided for use of pan head screws 152 in conjunction with the screw down hanger bracket 150, as shown in FIG. 3.

A tongue and groove assembly is formed at the upper and lower edges of the rear panel 20. Upper tongue 24a, which is spaced from the exterior back wall section 38a, extends downwardly from the upper edge of the rear panel 20. Lower tongue 24a also extends downwardly at the lower edge of back wall section 38b. The rear surface of upper tongue 24a extends not only beyond the rear of back wall section 38a but also beyond the rear surface of the center back wall section 36. The rear surface of the lower tongue 24b, however, does not extend beyond the rear surface of the back wall center section 36. Grooves 26a and 26b, each of which faces downwardly, are formed by the tongues 24a and 24b. The upper groove 26a is formed between upper tongue 24a and the rear surface of the upper back wall section 38a. The lower groove 26b is formed between the lower tongue 24a and a stepped flange 27 which extends from the lower end of outer back wall section 38b. A pair of channels 28a and 28b are formed in the central elongate compartment 32 along the inner surface of the rear panel. These channels 28a and 28b are formed between inwardly projecting ribs 29a and 29b located at the juncture of the dividing walls 22 and the back wall of rear panel 20. Channels 28a and 28b are continuous along the entire length of the raceway sections 12. Grooves 26a and 26b, also extend continuously along the outer surface of the rear panel 20. By employing recesses that are continuous along the length of raceway section 12, the raceway sections can be attached to the hanger bracket at any point along their length and duplex receptacles can be mounted at any arbitrary point along the length of the raceway sections 12. Furthermore, the recesses formed by channels 28a and 28b can be used to establish a grounded interconnection between abutting raceway panels, or between raceway panels and base plates mounted to walls to secure other subassemblies, such as Tee transition members within the raceway assembly.

Enclosed elongate compartments 30, 32 and 34 are defined by the rear panels 20 and elongate cover 40. Cover 40 is generally U-shaped having an outer face 44 joined by sidewalls 42a and 42b on either end thereof. The cover 40 has inwardly protruding shoulders 46a and 46b at the free ends which permit the cover to be snapped onto the rear panel. The upper shoulder 46a is received within a recess formed by a ridge 23 located at the top of the rear panel 20. The lower inwardly projecting shoulder 46b engages the flange 27 adjacent the lower projecting lip 54b on hanger bracket 50. Two continuous spines 48a and 48b are located on the inner surface of face 44 and engage the free ends of the divider walls 22 when the cover is mounted on the rear panel to provide complete electrostatic shielding between compartments. It should be understood that both of the rear panels 20 can be configured for use in raceway assemblies having fewer than three isolated compartments or more than three isolated compartments.

The rear panels 20 can be mounted on the surface of walls by securing the rear panel to hanger brackets previously attached to the walls. Conventional wall panels which are modular in nature can be mounted in abutting relationship as shown in FIG. 1. Standard wall panels of this type have at least one row of apertures 8 at the intersection between adjacent modular panels. These apertures 8 are accessible and can be used to secure hanger brackets at the intersection between wall panels. Rear panels 20 can be attached to modular wall panels without the use of fasteners which would mar the modular wall panels. Hanger bracket 50 is specifically intended to be mounted at the intersection of two modular panels. Hanger brackets 50 include a plate 52 which can be mounted against the surface of the walls. A plurality of hook members 56a, 56b and 56c extend orthogonally relative to the plate 52. These L-shaped hook members 56a, 56b and 56c are dimensioned to fit within the apertures 8 extending in vertical rows on the walls. Modular panel hanger brackets 50 have an opening 58 adjacent the intersection between the plate member 52 and the orthogonal section on which hook members 56a, 56b and 56c are located. A U-shaped latch clip 60 is insertable through opening 58 after the hanger bracket 50 is assembled on the modular wall panels with hook members 56a, 56b and 56c positioned within apertures 8. The latch clip 60 is a U-shaped member having parallel latch clip legs 62a and 62b. The latch clip is inserted through the opening 58 with the latch clip legs 62a and 62b extending on opposite sides of the orthogonal hook member section of the hanger bracket 50. Latch clip 60 serves to secure the hanger brackets 50 in place against an upwardly directed force, which might occur upon removal of a plug from a receptacle in the raceway. Latch clips 60 fit within apertures 8 and substantially completely fill the rectangular shaped aperture 8. The bight section 64 extending between the two legs 62a and 62b of the latch clip 60 is flush with the plate 52 when the latch clip is fully inserted, as shown in FIG. 2.

The screw down hanger bracket 150 shown in FIG. 3 differs from the modular panel hanger bracket in that screws 52 extending through holes in the flush plate of screw down hanger bracket 150 secure the hanger bracket directly to the wall without the use of hook members. (See FIG. 11.)

Not only are power and signal cables 2 and 4 deployed within separate elongate compartments 30 and 32 in raceway sections 12, but outlets or electrical interfaces, such as duplex receptacles 90 and jack couplers 88, can be positioned at arbitrary discrete locations within the isolated compartments. FIGS. 3–6 depict the installation of outlet receptacles and jacks in the raceway assembly. Standard duplex receptacles 90 can be attached directly to the rear panel 20 of raceway sections 12 by employing U-shaped receptacle brackets 100a and 100b. A duplex receptacle 90 of standard construction can be mounted within the power compartment 32, as shown in FIG. 3.

Figures 4, 4A, 4B:
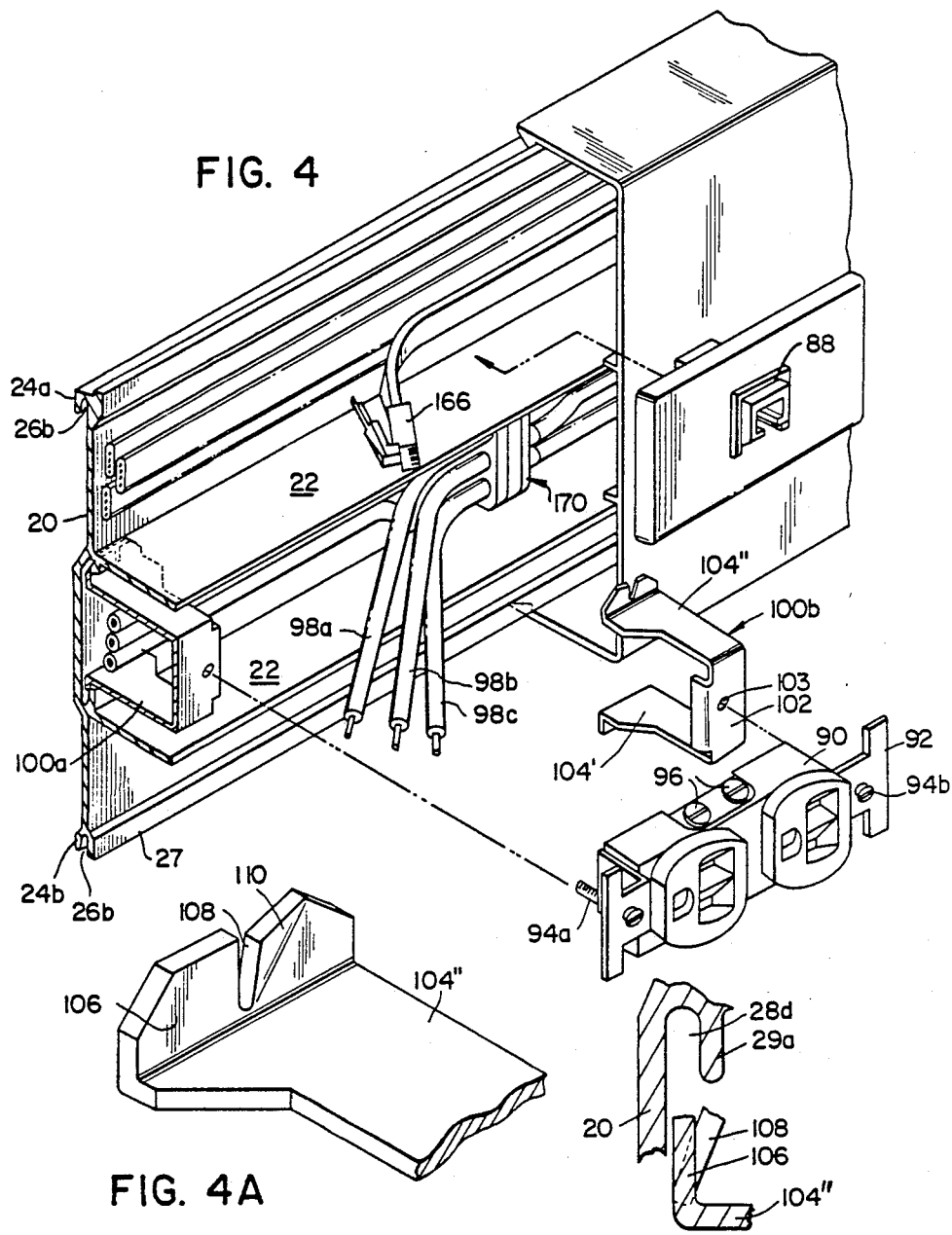
FIG. 4 is an exploded perspective view depicting the manner in which duplex receptacles and data couplers, such as modular jack couplers, can be attached to the raceway at any desired location.
FIG. 4A and FIG. 4B depict details of the manner in which a duplex receptacle bracket can be attached to the raceway.
Figure 5:
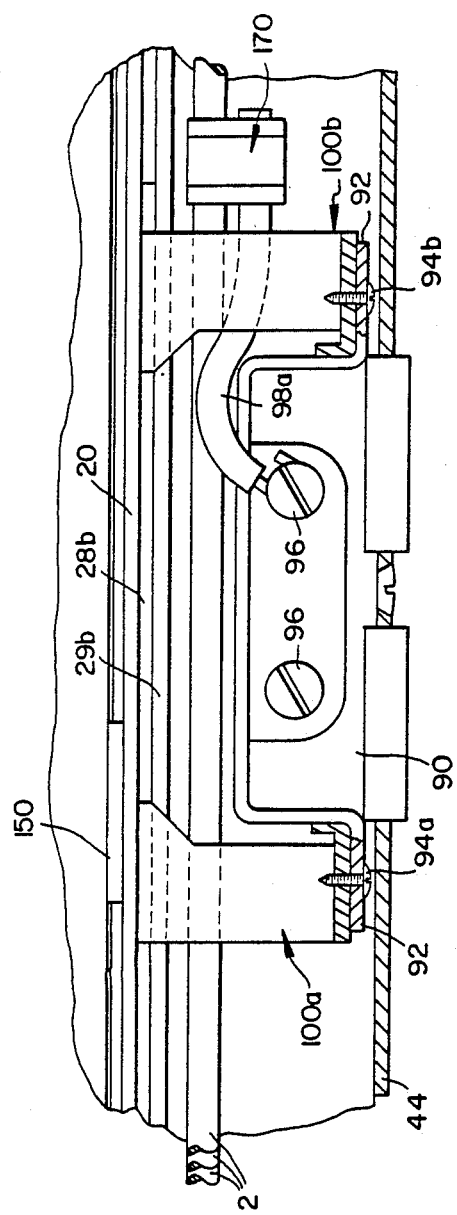
FIG. 5 is a sectional view showing the interconnection of a duplex receptacle to power conductors in a raceway assembly.
Figure 6:
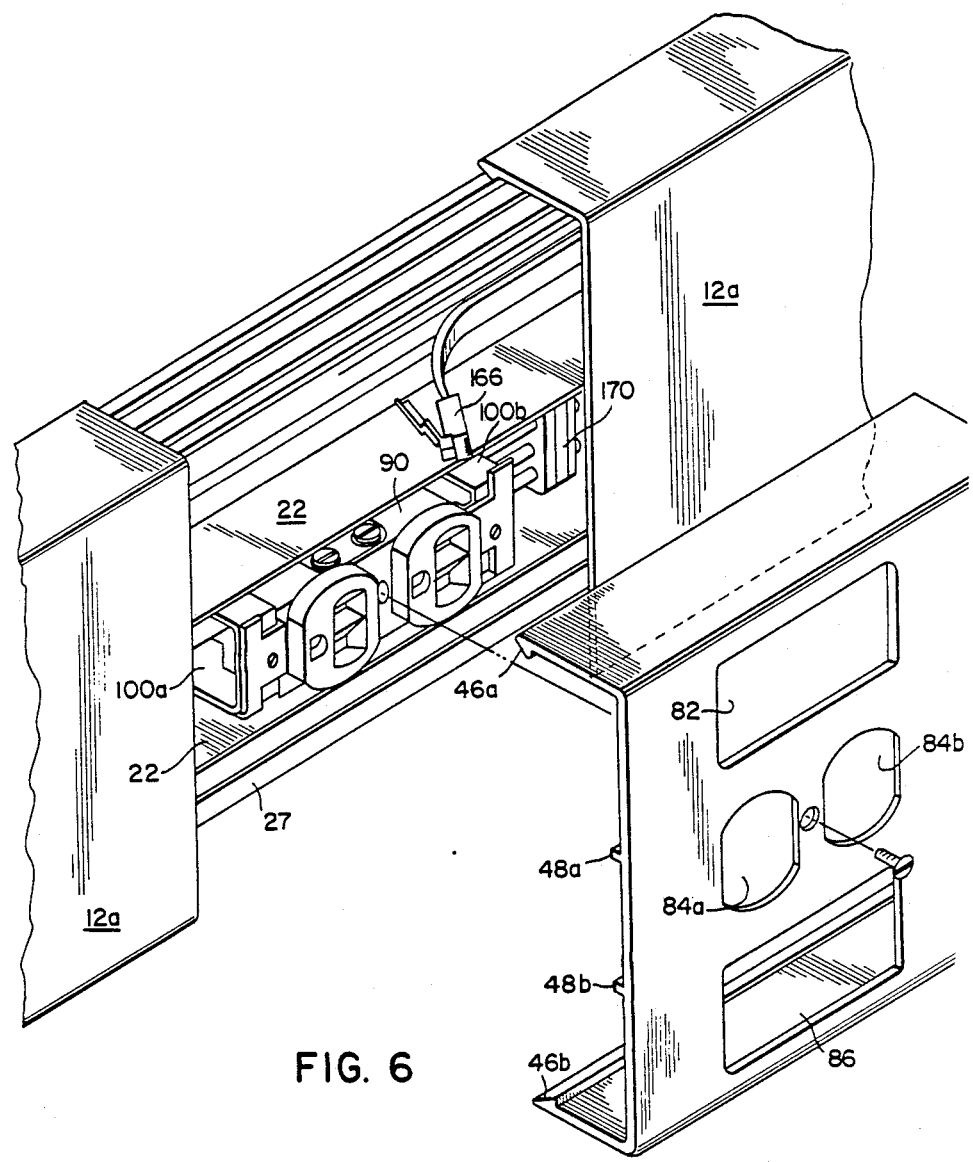
FIG. 6 depicts the manner in which a receptacle cover is secured at a location in which the raceway contains duplex power receptacles and modular plugs for interconnection of telephone or data equipment.

The standard duplex receptacle 90 shown in FIG. 4 has mounting ears 92 at either end which can be attached to stamped and formed receptacle brackets 100 by simply screwing each mounting ear to a separate receptacle bracket 100a or 100b. The receptacle brackets 100 each are stamped and formed of a conductive metal and have a central strap portion 102 with arms 104 and 104' extending from opposite ends. The free end of each arm 104, 104' is bent upwardly to form a foot 106 which extends generally orthogonally relative to the arm 104. A slit 108 is formed in the foot 106 and a tab portion 110 adjacent the slit is bent out of the plane of the foot 106, as shown in FIG. 4A and FIG. 4B. Feet 106 and tab 110 are dimensioned for receipt within channels 28a and 28b. The receptacle brackets 100 can be rotated about an axis perpendicular to the central strap 102 and to the rear panel 20 such that the feet 106 are rotated into the channels 28a and 28b with the tabs 110 being deflected upon rotation of the feet 106 into the channels 28a and 28b. The deflected tab 110 then forms a secure electrical connection with the ribs 29a and 29b upon complete insertion of the bracket 102 into the power cable compartment 32. After two receptacle mounting brackets are in place in compartment in 32, a standard duplex receptacle can be secured to the brackets 100a and 100b by means of screws 94a and 94b to form a ground connection between the ears 92, the receptacle brackets 100 and the rear panel 20. Since the power receptacle is affixed to the rear panel 20 by the brackets 100, a tug on the cord of a plug inserted in the duplex receptacle will not dislodge the cover 40, thus eliminating a potential shock hazard.

Figure 13:
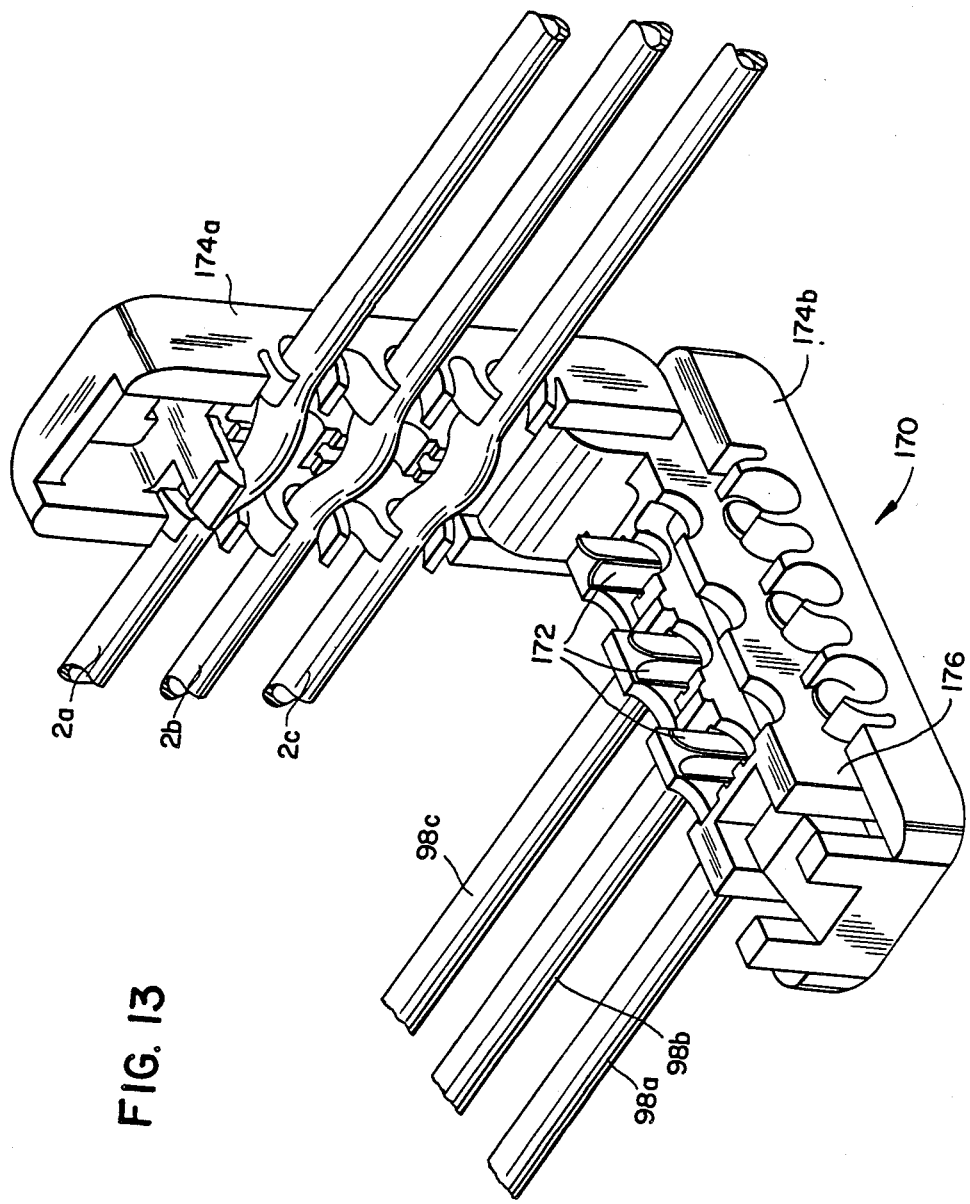
FIG. 13 is a partially exploded perspective view showing a splice connector which can be used in conjunction with pigtail wires leading to a wiring device such as a duplex receptacle.

Interconnection between the duplex receptacle 90 and the three wires in the power cable 2 can be established by using a splice connector 170 shown in FIG. 3. This splice connector 170 comprises at least three terminals 172 having wire receiving slots at opposite ends. These terminals are mounted in a splice connector base and covers 174a and 174b, which are pivotally mounted on the base, can be closed in surrounding relationship to the splice connector base 176 to terminate wires 2a, 2b, and 2c in power cable 2 to pigtail wires 98a, 98b and 98c leading from the hot ground and neutral wires to appropriate screws 96 on the conventional duplex receptacle. The splice connector depicted in FIG. 13 is described in greater detail in U.S. patent application Ser. No. 101,511 entitled (Splice Connector Having Pivoted Inserters) filed concurrently and commonly assigned. This last mentioned patent application is hereby incorporated by reference.

This assembly for terminating a duplex receptacle to power conductors is not limited to use with the specific receptacle shown in the preferred embodiment of this invention. Indeed, this approach is intended to permit the use of any of a number of standard duplex receptacle configurations, thus eliminating the need to use a duplex receptacle especially adapted for use in this raceway.

A separate approach is employed to provide an interface between the signal conductors in cable compartment 30. As depicted herein, interconnection to cables having a conventional modular telephone plug 166 attached at one end can be made by using a coupler 88 mounted on a face plate which can be attached directly to an outlet cover 80. Cover 80 comprises a short section having the general configuration of cover 40 but including a plurality of openings to provide access to the respective compartments of the raceway sections 12. The preferred embodiment of the outlet cover 80 depicted herein has a telephone cover opening 82 located in alignment with compartment 30, duplex receptacle cover openings 84a and 84b aligned with compartment 32, and a storage tray opening 86 aligned with compartment 34. Openings 82 and 86 are identical so that the outlet cover has no unique vertical orientation. A conventional telephone coupler 88 mounted in a face plate can be snapped into the telephone cover opening 82 in outlet cover 80 to provide an appropriate interface to the signal cables in compartment 30. Note that the standard modular telephone plug 166 can be inserted into the rear cavity of the coupler 88 prior to assembly of the face plate to the outlet cover 80. A bushing 78 is provided to fit within storage tray opening 86, which is large enough to enhance air cooling of wiring stored in the tray. Outlet cover 80 can be screwed to the duplex receptacle. Since outlet cover 80 overlaps cover 40, the raceway cover 40 cannot be removed without removing the outlet cover. Electrical grounding of the covers 40, 80 is provided by contact with the rear panel 20 which is through the screw in through outlet cover 80 and the power brackets 100 when the outlet is grounded.

Figures 7, 7A:
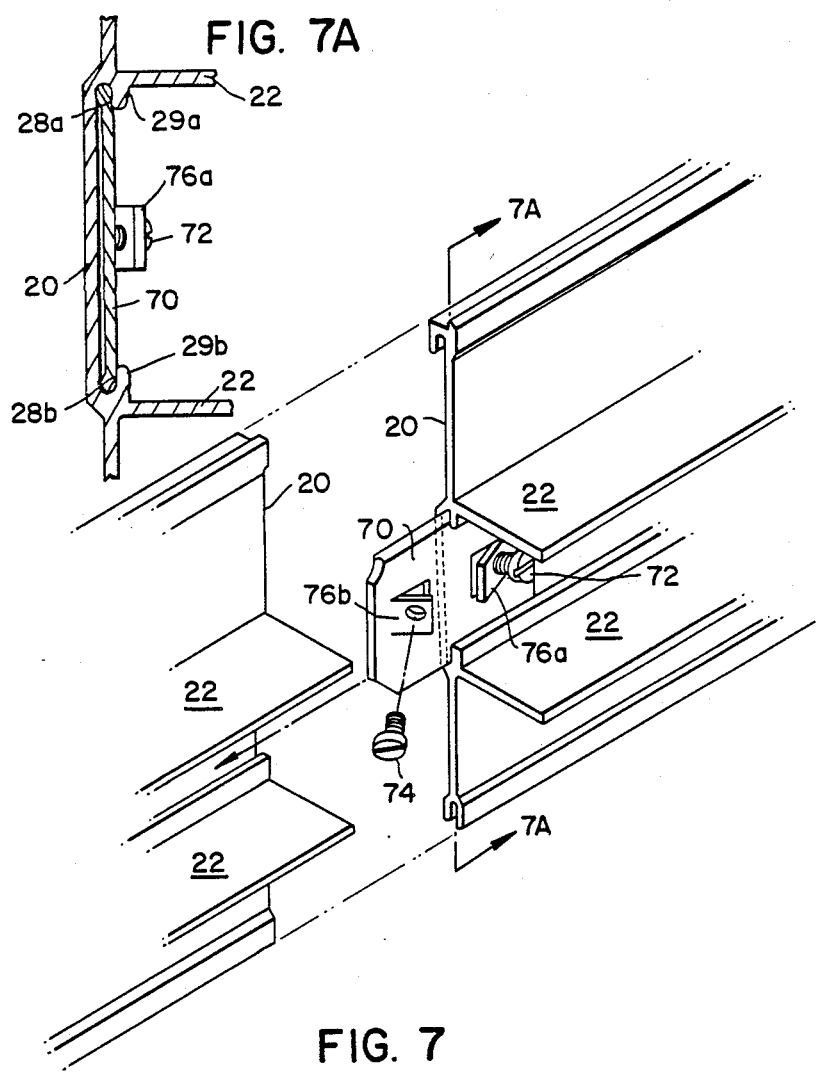
FIG. 7 shows the manner in which abutting raceway panels are attached and grounded to each other.
FIG. 7A shows a sectional view taken along section line 7A—7A in FIG. 7 depicting the ground connection formed by a separate splice wedge.
Figures 8, 8A:
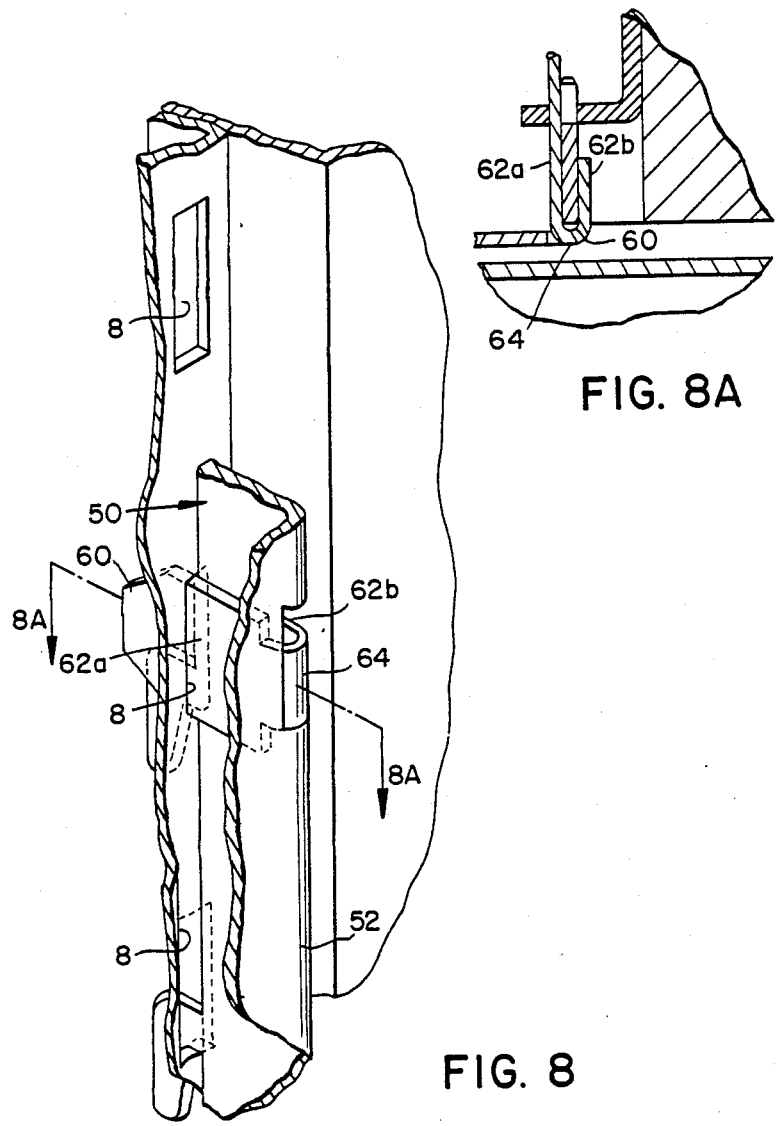
FIG. 8 is a perspective view showing the manner in which a hanger bracket can be secured to a standard modular wall panel.
FIG. 8A is a fragmentary sectional view taken along section line 8A—8A further illustrating the manner in which the hanger bracket can be locked in place.

Although raceway sections 12 would normally be supplied in standard lengths, it would generally be necessary to interconnect two adjoining raceways. Interconnection of adjoining or abutting raceways is depicted in FIG. 7. A generally planar splice member or splice wedge provides an interface means or panel interconnect means for electrically commoning rear panels 20 at the point where they abut. Splice wedge 70, shown in FIG. 7 and FIG. 7A, can be inserted into channels 28a and 28b at the end of a panel 20. The edges of the splice wedge 70 are bent downwardly to insure that a secure fit is established in the channels 28a and 28b to guarantee a good connection. After splice wedge 70 is inserted into the channels 28a and 28b on one raceway, a screw 72 can be secured through a tab 76a into engagement with the raceway rear panel. The wedge is securely attached to the first panel. The wedges 70 have a shoulder and step in a planar portion to provide a stop. The angle of the grounding screw draws the splice wedge into the shoulder causing continuity to exist between the wedge body and rear panel 20 as well as between the screw and the rear panel 20. The second rear panel 20 can then be assembled by inserting the free edges of the splice wedge 70 in channels 28a and 28b on the second channel member. The screw 74 can then be attached through tab 76b to mechanically secure the splice wedge 70 to the second rear panel. Note that it will not be necessary to employ a hanger bracket at the juncture between the two rear panels.

Figure 9:
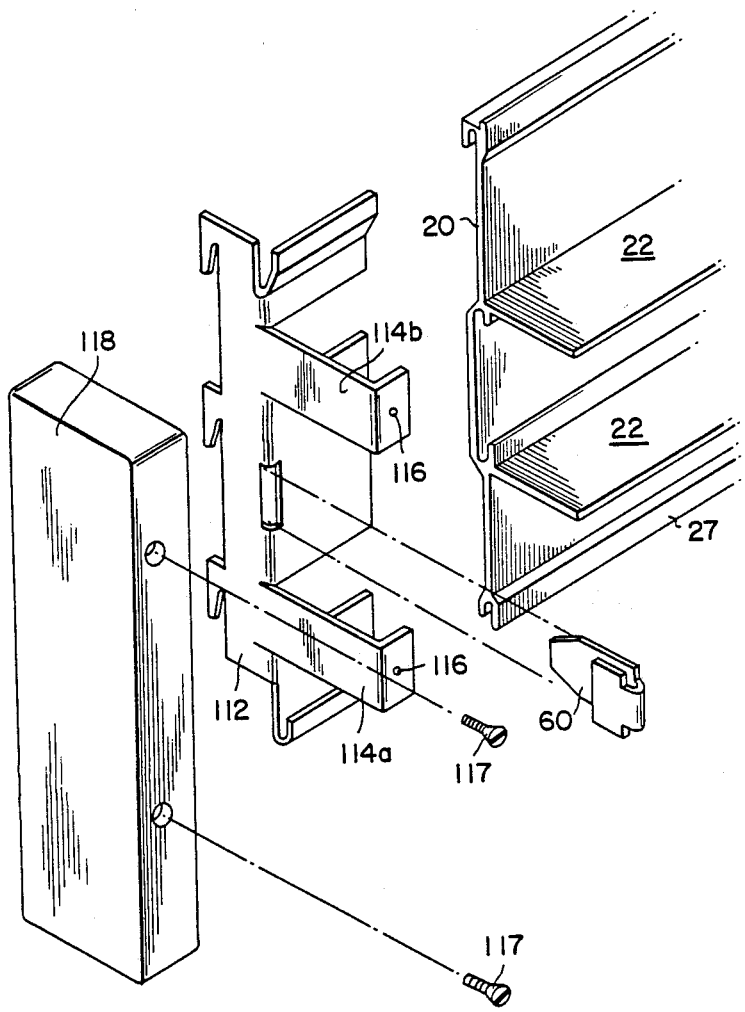
FIG. 9 is an exploded perspective view of an end bracket assembly.

FIGS. 9-12 depict accessory fittings which can be employed in the raceway assembly 10. FIG. 9 depicts an end plate bracket 112 which can be secured at the abutting joint between two modular wall panels on the end of raceway 20. The end plate bracket 112 is substantially identical to the modular panel hanger bracket 50 with the exception that two end plate bracket arms 114a and 114b have been formed upwardly from the plate section of end plate bracket 112. The ends of the end plate bracket arms 114a and 114b are bent inwardly and a screw hole is provided in each end. End plate 118 is then mounted on the side of the end plate bracket 112 and screwed to the end plate bracket arms 114a and 114b. A cover can then be assembled over the rear panel 20.

FIG. 10 discloses the components of a Tee transition assembly for interconnecting a horizontal raceway 12a to a vertical raceway 12b. FIG. 10 also shows an assembly in which an external cord leading from the raceway can be permanently mounted. FIG. 10A shows the assembled configuration illustrated by the exploded components shown in FIG. 10. A Tee-up transition block base plate 120 can be mounted on the wall at the location for the Tee transition. The base plate 120 can be secured to the wall by using conventional screws. A Tee-up transition block cover 122 having an opening for a single horizontal raceway and a single vertical raceway is mounted over the base plate 120. A transition block wedge 126, which can be screwed to a base plate flange 128, serves to electrically ground the raceway rear panel to the base plate 120 in the same fashion as depicted with respect to splice wedge 70. Transition block wedge 126 differs from splice wedge 70 in that only one end is intended for insertion in a channel in the raceway rear panel. An end plate mounting bracket 130 can be mounted on the interior of cover 122 so that an end plate 132 can be secured to the end plate mounting bracket 130 by means of conventional screws. A standoff post 138, which can be secured to base plate 120, holds the mounting bracket 130 adjacent to the surface of cover 122 to permit alignment with screw holes located in the end plate 132. A cutout 134 in end plate 132 receives a conductor bushing 136 through which a round cable may be inserted into the raceway.

Figure 11:
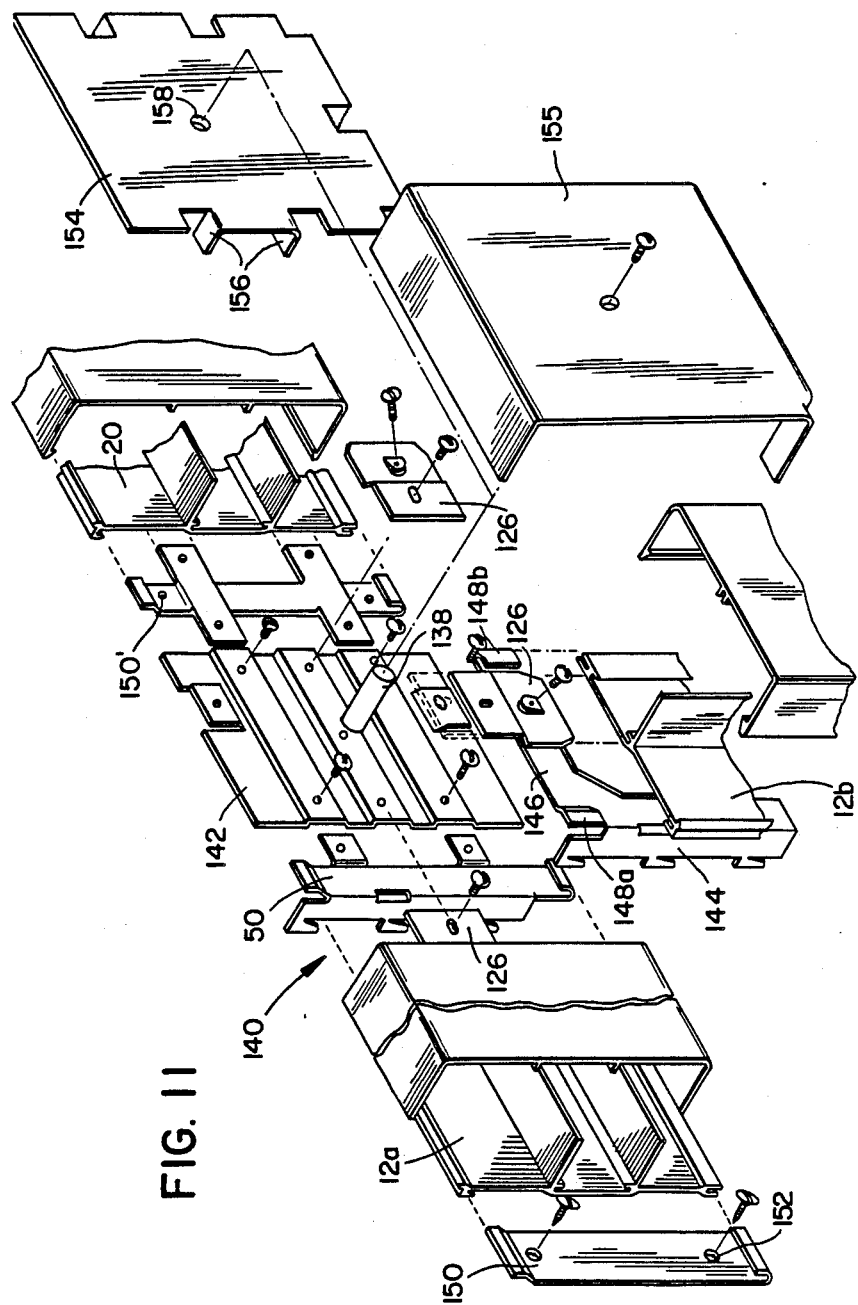
FIG. 11 is an exploded perspective view showing a Tee down transition from a through horizontal raceway to a vertical raceway and including a separator panel.

FIG. 11 shows another Tee assembly 140 suitable for use with a single vertical raceway member 12b and a through horizontal raceway member 12a. The Tee assembly 140 includes a base plate 142 which can be secured to the wall. The assembly shown in FIG. 11 also includes a modular hanger bracket 50 containing tabs for engaging the base plate 142 and a screw down hanger bracket 150 also containing tabs for engagement with base plate 142. Hanger brackets 50 and 150 engage two horizontal raceway sections 12a to attach the horizontal raceway. Note that the ends of the horizontal raceway 12a are spaced apart on opposite sides of the base plate 142. A second screw down hanger bracket 150 is shown to demonstrate that the hanger bracket 12a can be supported at any position along their length. The vertical raceway 12b depicted herein comprises a two compartment raceway. Note that there is no reason why a two compartment raceway and a three compartment raceway cannot be employed when only two separate sets of cables are to be employed. A vertical raceway hanger bracket 144 of the type which can be secured to modular wall panels is employed in the configuration shown in FIG. 11. The vertical raceway hanger bracket 144 has a vertical raceway mounting arm 146 having protruding lips 148a and 148b vertically oriented to provide lateral support for vertical raceway 12b. Transition block wedges 126 provide a grounded interconnection between base plate 142 in each of the raceway rear panels in the same fashion as discussed with reference to FIG. 10. A separator panel 154 having standoff legs 156 is used to separate conductors in separate isolated compartments at a Tee transition. Note that the divider walls on the horizontal and vertical raceways do not overlap the base plate 142.

Figure 12:
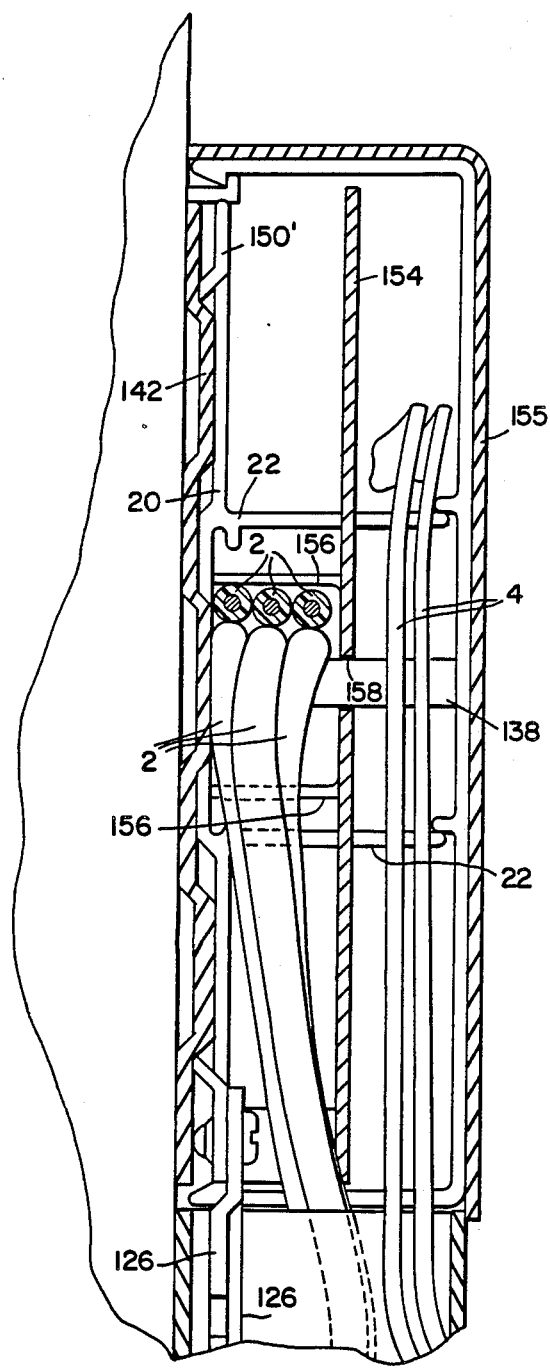
FIG. 12 is a section view taken at a transition such as depicted in FIG. 11 showing the manner in which electrical conductors in separate raceway compartments are separated at a horizontal to vertical transition.

FIG. 12 shows the separator panel 154 mounted at the Tee intersection formed by the components in FIG. 11. Note that the standoff posts 138 extending from the base plate 142 is received through a hole 158 in the separator panel. The standoff legs 156 position the separator panel 154 at a central location between the rear panel 20 and the transition cover 155. By disposing the separator panel 154, as shown in FIG. 12, it can be seen that cables in one compartment can be positioned on one side of the separator panel and cables in a separate compartment can be positioned on the other side of the cable. In the configuration shown in FIG. 12, the power cables are positioned on the inside of the separator panel 154 while the signal cables are located on the outside of the separator panel between the separator panel and the cover. The raceway assembly is adapted for modular construction and the same transition members can be employed for right angle transitions in any direction.

The raceway panel depicted herein can be easily assembled to a wall by first securing either hanger brackets 50 or 150 at desired locations to provide support for horizontal raceway sections 12a and lateral support for vertical raceway sections 12b. Rear panels 20 can then be assembled to the hanger brackets by fitting tongues 24a and 24b adjacent protruding lips 54a and 54b with the protruding lips 54a and 54b received within grooves 26a and 26b. Relatively long sections can be installed by a single installer. At this point, cables can be deployed within the raceway sections so that the cables will be housed in separate compartments. Covers 40 can be positioned in surrounding relationship to isolate cables within respective compartments. Engagement between the protruding lips 54a, 54b and the tongues 24a, 24b at the top and the bottom of the assembly, which is maintained by the cover 40 which fits over this intersection, will prevent dislodgement of the assembly in response to an upward force, such as a tug on a cord. Both the covers and the rear panels can be cut to length to provide for vertical to horizontal transitions or to provide for receptacle outlet stations. After duplex receptacles are secured in respective compartments as previously discussed, outlet receptacle covers can be snapped on to the rear panels. Modular jack couplers can be secured to these outlet receptacles as previously discussed so that outlets for both signal and power are provided. It should be understood that outlets of each type need not be provided at each location and the unused opening and outlet covers may be aesthetically closed. The storage cable tray provided as a third compartment permits access cord storage. For example, a cord for an outlet plug 168 shown in FIG. 3 can be inserted into this cable storage tray. A protective bushing can be provided around the storage tray opening to prevent damage to the cables.

The preferred embodiment of the invention disclosed herein represents only one of a number of forms in which this invention may be embodied. For example, the raceway assembly can be expanded to include a greater number of compartments for carrying a greater variety of cables. Other types of electrical interfaces may be employed in addition to those depicted herein. Furthermore the invention is not limited to the deployment of electrical conductors since other types of conduits can be employed in conjunction with the electrical cables. A number of embodiments within the scope of the claims will be apparent to those of ordinary skill in the art.

We claim:

1. An assembly for use in deploying wires along a wall comprising a raceway with elongate compartments for housing the wires, the raceway comprising at least one elongate member with a rear panel, the elongate compartments being located along the interior of the rear panel, the rear panel having at least one elongate tongue and groove on the exterior, each tongue being spaced from the rear panel with said groove formed between the tongue and the exterior of the rear panel, the assembly further comprising a plurality of hanger brackets, each securable to the wall and engagable with the rear panel, each hanger bracket having at least one protruding lip received within the groove on the rear panel when the raceway is mounted on said hanger brackets secured to the wall, the rear panel of the raceway comprising an extruded member having a constant cross section along its length, the groove formed between the tongue and rear panel being continuous so that the raceway can be mounted on said hanger brackets at any position along its length.

2. The assembly of claim 1 wherein each hanger bracket has a plate disposable on the surface of the wall, each lip protruding from the plate.

3. The assembly of claim 2 wherein each hanger bracket has a plurality of hook members extending orthogonally relative to the plate, the hook members being configured for receipt in apertures in vertical rows on the wall.

4. The assembly of claim 3 further comprising a latch clip insertable into at least one of the apertures to anchor each hanger bracket to the wall, the hanger bracket including an opening for receiving the latch clip after the hook members are received within respective apertures.

5. The assembly of claim 4 wherein the latch clip comprises a U-shaped member having two legs, one leg being insertable through the hanger bracket opening.

6. The assembly of claim 3 comprising horizontal and vertical raceways, and horizontal hanger brackets and vertical hanger brackets, each hanger bracket having vertical hook members for securing the hanger brackets on the surface of a wall, the lip on the vertical hanger brackets extending vertically, the lip on the horizontal brackets extending horizontally.

7. The assembly of claim 6 further comprising a separator panel, the separator panel being attached to the assembly at the intersection of said vertical and horizontal raceways, the separator panel defining fore and aft sections so that wires in one compartment are restricted to the fore section and wires in another compartment are restricted to the rear section so that wires in separate compartments cross at an intersection, the wires in separate compartments remaining isolated at the intersection.

8. The assembly of claim 3 further comprising cover means, the cover means being attached to the rear panel and overlapping a lip at an edge of the rear panel to entrap the lip.

9. The assembly of claim 3 wherein each hanger bracket has two spaced apart said protruding lips each extending in the same direction, and each rear panel has two spaced apart said tongues extending in the same direction, the rear panel being mounted on the hanger brackets by initially positioning the rear panel with the grooves between the tongues and the exterior of the rear panel in alignment with and spaced from the hanger bracket lips and then by moving the rear panel toward the hanger bracket protruding lips until the lips are received within the grooves.

10. The assembly of claim 9 wherein one protruding lip comprises a U-shaped extension at one edge of the hanger bracket and the other protruding lip comprises a stepped section at the opposite end of the hanger bracket, the two protruding lips being in different planes.

11. The assembly of claim 9 wherein portions of the rear panel adjacent each protruding lip are spaced from the hanger bracket.

12. A raceway for deploying wires along a wall comprising a panel having means defining a plurality of elongate compartments for receiving the wires, the panel comprising an extruded member having a constant cross section along its length, the rear panel including elongate tongues at a plurality of positions on the exterior thereof, a groove being defined between each tongue and an exterior surface of the panel, each groove facing in the same direction, the rear panel including a pair of ribs spaced from an interior surface of the panel, a channel being defined between each rib and the interior surface of the panel, the open end of each channel facing the other channel, the channels being disposed along opposite edges of at least one of the elongate compartments, and receptacle brackets for attaching an electrical receptacle in an elongate compartment having channels disposed along the opposite edges thereof, free ends of each receptacle bracket being inserted within the channels, whereby the raceway can be secured on the wall by receipt of hanger brackets in the grooves on the exterior of the panel and panel interconnect means including electrical interface means can be attached to the raceway upon engagement of the electrical interface means with the ribs and channels.

13. The raceway of claim 12 wherein at least one divider wall extends from the interior surface of the panel to separate adjacent elongate compartments.

14. The raceway of claim 13 wherein the ribs in at least one compartment extend from spaced apart divider walls adjacent the juncture of the divider walls with the rear panel.

15. The raceway of claim 13 further comprising cover means for enclosing the elongate compartments.

16. The raceway of claim 12 wherein the panel interconnect means comprises a planar splice member insertable into the end of a channel.

17. The raceway of claim 16 wherein the electrical interface means further includes a fastener attachable to a wedge.

18. A raceway assembly for use in deploying cables along a wall and for positioning outlet receptacles at any arbitrary location along the wall, separate cables being confined to isolated areas, the raceway assembly comprising:
- a plurality of rear panels, each comprising an extruded electrically conductive member having a constant cross section;
- at least one divider wall extending transversely of each rear panel;
- a plurality of covers, each cover comprising an extruded electrically conductive member having a constant cross section, each cover, each rear panel and the divider walls defining a plurality of closed elongate compartments for receiving the cables;
- a plurality of protruding surfaces on the rear panel of the raceway defining a plurality of elongate recess means extending along the length of the rear panel;
- panel interconnect means for forming a grounding attachment between multiple rear panels, including tabs configured for receipt within the recess means; and
- cover interconnect means for forming a grounding attachment between each cover and a rear panel, the cover interconnect means including a protrusion configured for receipt within a recess means, whereby continuous said elongate compartments, each comprising an electrically grounded enclosure, can be constructed from a plurality of like components.

19. The raceway assembly of claim 18 wherein the divider walls are integral with the rear panels.

20. The raceway assembly of claim 18 wherein the recess means comprises outwardly facing grooves defined on the top and bottom of each rear panel and inwardly facing opposed channels defined on the interior of each rear panel.

21. The raceway assembly of claim 20 wherein the tabs on the panel interconnect means are configured for receipt within the inwardly facing channels.

22. The raceway assembly of claim 21 wherein the protrusion on the cover interconnect means is configured for receipt within a said outwardly facing groove.

23. The raceway assembly of claim 20 further comprising receptacle brackets for securing outlet receptacles within the raceway assembly, the receptacle brackets including flanges configured for receipt within the inwardly facing channels on the rear panels.

* * * * *